United States Patent
Chu et al.

(10) Patent No.: US 6,746,029 B2
(45) Date of Patent: Jun. 8, 2004

(54) PHOTOGRAPH VEHICLE

(75) Inventors: Tim Chu, Taipei (TW); Jacky Tung, Kaohsiung (TW); James Hon, Tainan (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/077,717

(22) Filed: Feb. 15, 2002

(65) Prior Publication Data

US 2003/0155730 A1 Aug. 21, 2003

(51) Int. Cl.$^7$ ................................................. B62B 11/00
(52) U.S. Cl. ..................... 280/47.35; 396/428; 707/204; 705/28; 355/62
(58) Field of Search ................... 705/28, 500; 396/419, 396/428; 248/129; 348/207.1; 280/47.34, 47.35, 651, 79.11, 79.2, 79.3; 707/204; 355/61, 62, 64; D34/21

(56) References Cited

U.S. PATENT DOCUMENTS

| | | | | |
|---|---|---|---|---|
| 1,937,433 A | * | 11/1933 | Moe | 33/17 R |
| 2,107,074 A | * | 2/1938 | Hineline | 355/64 |
| 2,112,449 A | * | 3/1938 | Proudfit | 355/62 |
| 2,324,842 A | * | 7/1943 | Huebner | 355/62 |
| 2,339,657 A | * | 1/1944 | Smith | 396/504 |
| 2,599,269 A | * | 6/1952 | Markle | 396/5 |
| 2,882,790 A | * | 4/1959 | Broms | 355/62 |
| 2,990,764 A | * | 7/1961 | Wilder | 182/127 |
| 3,228,283 A | * | 1/1966 | Fulton et al. | 396/428 |
| 3,758,205 A | * | 9/1973 | Oxbury | 355/64 |
| 3,902,182 A | * | 8/1975 | Hillborg | 396/428 |
| D243,518 S | * | 3/1977 | Dillon et al. | D34/21 |
| 4,060,819 A | * | 11/1977 | Bahnsen | 396/419 |
| 4,542,909 A | * | 9/1985 | Littwin et al. | 280/79.11 |
| 4,684,230 A | * | 8/1987 | Smith | 396/428 |
| 4,839,675 A | * | 6/1989 | Owen | 396/429 |
| 6,439,515 B1 | * | 8/2002 | Powers | 248/129 |
| 6,467,780 B1 | * | 10/2002 | Winslow | 280/47.35 |
| 6,549,891 B1 | * | 4/2003 | Rauber et al. | 705/28 |
| 6,597,392 B1 | * | 7/2003 | Jenkins et al. | 348/207.1 |
| 2001/0032246 A1 | * | 10/2001 | Fardella et al. | 709/206 |
| 2003/0081126 A1 | * | 5/2003 | Seaman et al. | 348/207.1 |
| 2003/0084106 A1 | * | 5/2003 | Erev et al. | 709/206 |

FOREIGN PATENT DOCUMENTS

DE  3719665  * 8/1988

OTHER PUBLICATIONS

US patent application Publication 2002/0035522—dated Mar. 2002.*

* cited by examiner

Primary Examiner—Bryan Fischmann
(74) Attorney, Agent, or Firm—Tung & Associates

(57) ABSTRACT

A photograph vehicle which may be equipped with a digital camera for photographing supplies to be ordered by personnel in a semiconductor production plant and a computer which may be provided in communication with a server, such that images of the supplies transmitted from the digital camera to the computer may be transmitted to the server and the personnel in the semiconductor production plant can observe the images on a desktop, laptop or palmtop computer via internet access to verify supply orders.

16 Claims, 2 Drawing Sheets

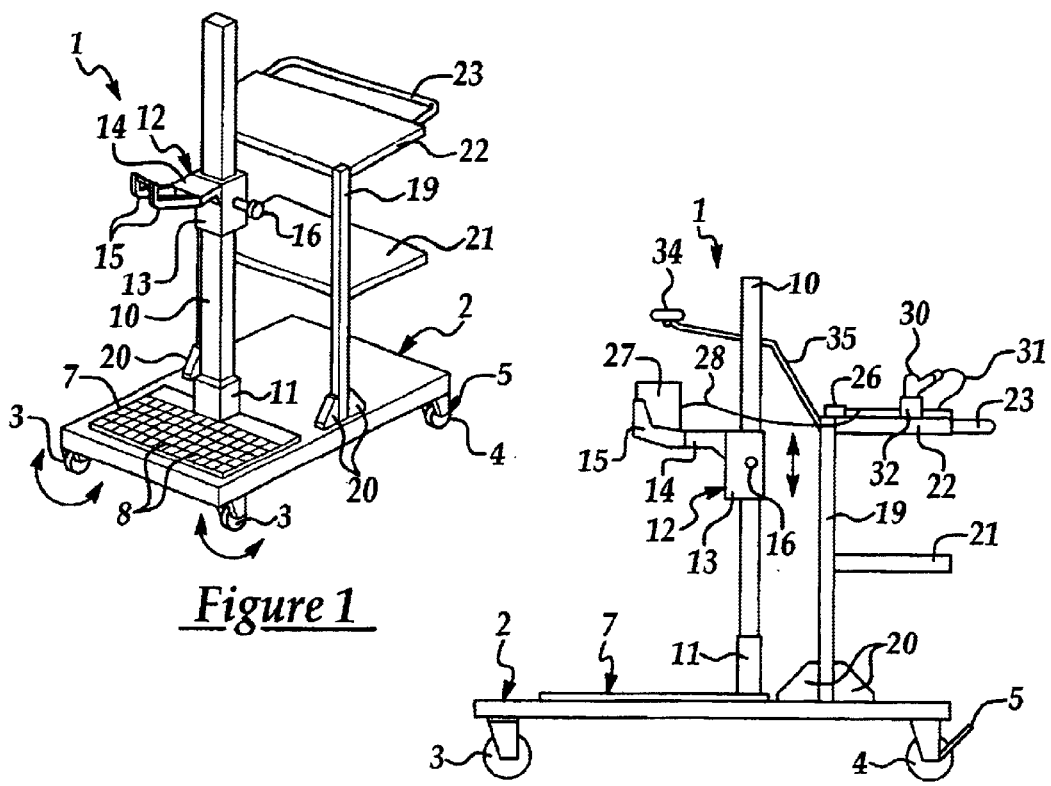
Figure 1
Figure 2
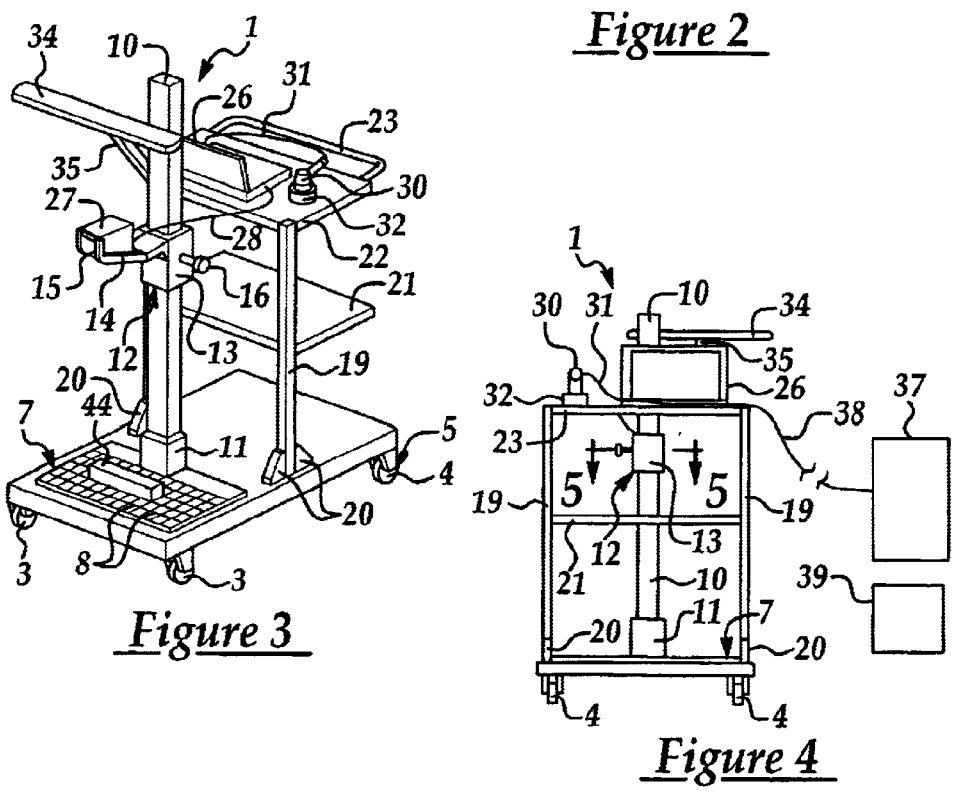
Figure 3
Figure 4

PHOTOGRAPH VEHICLE

FIELD OF THE INVENTION

The present invention relates to material requisition systems used in warehousing facilities for semiconductor production plants. More particularly, the invention relates to a photograph vehicle which is capable of transport among multiple storerooms in a warehousing facility for photographing tools, parts or other items and sending the photograph images to a server such that personnel in a remote location can, by internet access, readily verify the size and appearance of a needed item before ordering.

BACKGROUND OF THE INVENTION

In the semiconductor production industry, multiple semiconductor production plants may be serviced by one warehousing facility. The warehousing facility typically includes many storerooms in which are catalogued the parts, tools and other supplies and materials used in the various semiconductor production processes. When a part, tool or material is needed by engineers or other personnel in the semiconductor production plant, the personnel must order the item from the warehousing facility personnel. This procedure is time-consuming and requires careful attention and diligence by the warehousing facility personnel to select and retrieve the correct item ordered by the plant personnel.

Usually, plant personnel order tools, parts or materials listed by part number in a catalog. Because the catalogs lack pictures of the parts, mistakes are frequently made by the plant personnel as to the exact size or type of tool, part, material or other item needed. When the incorrect item reaches the plant personnel, he or she must re-order the item, and this results in production down time and a waste in warehousing personnel resources.

Many limitations are inherent in using a central or fixed photographing facility for photographing or imaging warehouse tools, parts or materials. One of these limitations is the inconvenience of moving the items from one of the many storerooms in the warehouse to the photography facility. This increases the chance that one or more of the items will be returned to the incorrect storeroom.

SUMMARY OF THE INVENTION

Therefore, it is an object of the present invention to provide for the convenient and efficient photographing of disparately-located parts, tools, materials or other supplies in a warehousing facility.

Another object of the present invention is to provide a photograph vehicle which can be transported among multiple storerooms of a warehouse facility for photographing parts, tools, materials or other supplies.

Still another object of the present invention is to provide a photograph vehicle which may be used in verifying the size and appearance of parts, tools, materials or other supplies ordered from a warehousing facility by personnel in a semiconductor production facility.

Yet another object of the present invention is to provide a photograph vehicle which may be equipped with a digital camera for photographing supplies to be ordered by personnel in a semiconductor production plant and a computer which may be provided in communication with a server, such that images of the supplies transmitted from the digital camera to the computer may be transmitted to the server and the personnel in the semiconductor production plant can observe the images on a desktop, laptop or palmtop computer via internet access to verify supply orders.

In accordance with these and other objects and advantages, the present invention is a transportable photograph vehicle which is fitted with a grid plate on which parts, tools, materials or other items in a warehousing facility are placed for photographing. A digital camera is adjustably mounted with respect to the grid plate and is connected to a computer provided on the vehicle. The computer may be provided in communication with a server containing a database of the photographic images of all of the items in the warehousing facility, such that engineers or other personnel in a remote location, typically a semiconductor production plant, may view the images on a computer having internet capability and confirm or verify the size and appearance of the items before ordering.

BRIEF DESCRIPTION OF THE DRAWINGS

The present invention will now be described, by way of example, with reference to the accompanying drawings, in which:

FIG. 1 is a front perspective view of an illustrative embodiment of the photograph vehicle of the present invention;

FIG. 2 is a side view of the photograph vehicle illustrated in FIG. 1, with the photograph vehicle equipped with a digital camera and laptop computer in typical application of the invention;

FIG. 3 is a front perspective view of the equipped photograph vehicle illustrated in FIG. 2;

FIG. 4 is a rear view of the photograph vehicle, with a server shown schematically in communication with a computer on the vehicle and a receiving computer schematically in communication with the server through internet access;

DESCRIPTION OF THE PREFERRED EMBODIMENTS

The present invention has particularly beneficial utility in application to imaging supplies in warehousing facilities for semiconductor production facilities. However, the invention is not so limited in application and while references may be made to such semiconductor production facilities, the invention may be more generally applicable to imaging of items in a variety of industrial warehouses.

Figure 5:
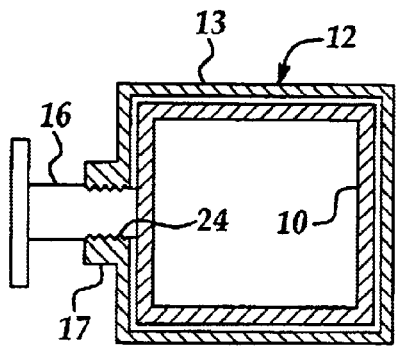
FIG. 5 is a cross-sectional view, taken along section lines 5—5 in FIG. 4, of a camera support carriage element of the photograph vehicle, more particularly illustrating an exemplary technique for vertically adjustably mounting a digital camera on the vehicle.
Figure 7:
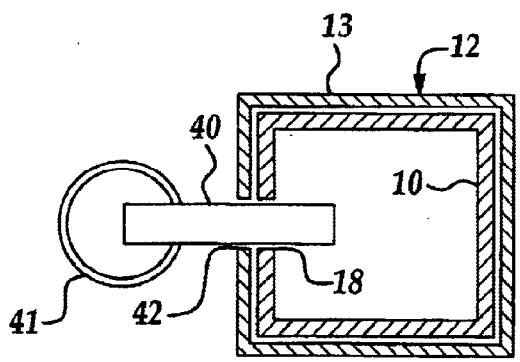
FIG. 7 is a cross-sectional view, taken along section lines 7—7 in FIG. 6, of the camera support carriage.

Referring initially to FIGS. 1, 5 and 7 of the drawings, an illustrative embodiment of the photograph vehicle of the present invention is generally indicated by reference numeral 1. The photograph vehicle 1 includes a base 2, typically having a generally rectangular configuration but which may be any suitable alternative shape. A pair of front wheels 3 and a pair of rear wheels 4 are provided on the bottom surface of the base 2 for rendering the photograph vehicle 1 portable on a floor or other surface (not illustrated).

While the front wheels 3 are typically rotatably mounted on the bottom surface of the base 2 for steering the photograph vehicle 1, the rear wheels 4 are typically rigidly attached to the base 2 and each may further be fitted with a brake 5 for rendering the photograph vehicle 1 immobile on the floor or other surface during use as hereinafter described. A generally rectangular grid plate 7, which may be any suitable alternative shape, includes multiple, spaced-apart, intersecting grid lines 8 that mark selected spacings along the respective dimensions of the grid plate 7. Typically, adjacent grid lines 8 on the grid plate 7 are spaced from each other at one centimeter intervals. Grid lines 8 which are spaced from each other at five or ten centimeter intervals, for example, may further be indicated by designating those grid lines 8 as darker than the adjacent, one centimeter grid lines 8, or by other designations known to those skilled in the art.

Figure 6:
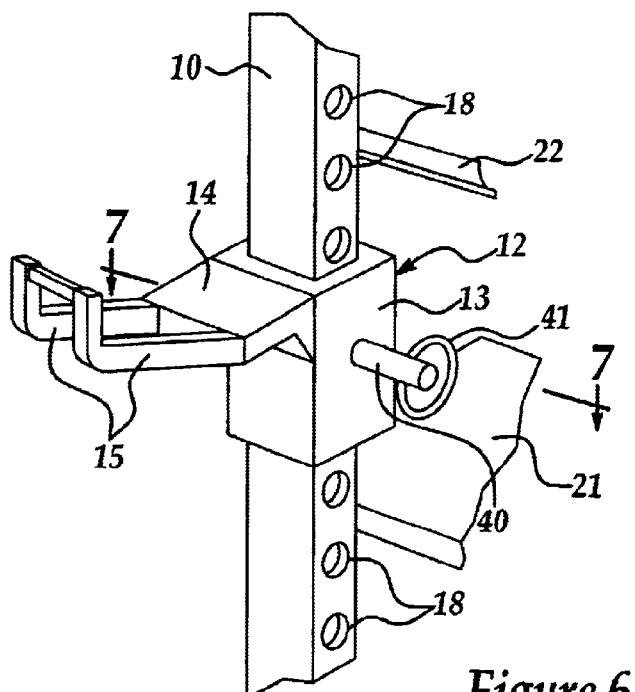
FIG. 6 is a perspective view, in section, of a camera support carriage component of the photograph vehicle of the present invention, illustrating an alternative technique for vertically adjustably mounting a digital camera on the vehicle.

An elongated carriage support post 10 extends upwardly from a support post base 11, which is mounted on the upper surface of the base 2, or alternatively, on the upper surface of the grid plate 7 adjacent to the rear edge thereof, as illustrated. A camera support carriage 12, the purpose of which will be hereinafter described, is vertically adjustably mounted on the carriage support post 10, above the grid plate 7. The camera support carriage 12 includes a sleeve 13, which is typically constructed of square tubing and slidably receives the carriage support post 10. A camera support bracket 14, fitted with a pair of forwardly-extending, parallel bracket arms 15, is provided on the front surface of the sleeve 13. In one embodiment of the invention, in which the camera support carriage 12 is illustrated in cross-section in FIG. 5, the front surface of the sleeve 13 is provided with a sleeve opening 24 and a protruding, interiorly-threaded carriage adjustment collar 17. An exteriorly-threaded carriage adjustment knob 16 is threaded through the carriage adjustment collar 17 and against the carriage support post 10 to secure the camera support carriage 12 at a selected height on the carriage support post 10. In another embodiment of the invention, in which the camera support carriage 12 is illustrated in FIG. 6 and in cross-section in FIG. 7, the carriage support post 10 is provided with multiple, vertically-spaced carriage adjustment openings 18. The camera support carriage 12 is secured at a selected height on the carriage support post 10 by extending a carriage adjusting pin 40, which may be fitted with a lanyard 41, through a sleeve adjusting pin opening 42 provided in the sleeve 13 and through a registering selected one of the carriage adjustment openings 18 in the carriage support post 10. In the foregoing manner, the camera support carriage 12 is secured at a selected height above the grid plate 7. It is understood that other techniques known to those skilled in the art may be used to vertically adjustably mount the camera support carriage 12 on the carriage support post 10.

A pair of parallel, spaced-apart shelf support legs 19 (one of which is shown in FIG. 1) extends upwardly from the upper surface of the base 2, typically adjacent to respective longitudinal or side edges of the base 2. Each shelf support leg 19 may be secured in an upright position on the base 2 by means of a pair of opposing leg base flanges 20, as illustrated. A top support shelf 22 is mounted between the shelf support legs 19 and extends rearwardly therefrom, and a rearwardly-extending bottom support shelf 21 may in like manner be mounted between the shelf support legs 19, beneath the top support shelf 22. A push handle 23 is typically provided on the top support shelf 22 to facilitate pushing or pulling the photograph vehicle 1 for transport thereof on the floor or other surface. A light 34, which may be mounted on the extending end of a folding support arm 35, may be mounted on the top support shelf 22, as illustrated, or on the carriage support post 10 or any other suitable element of the photograph vehicle 1 to facilitate illuminating the grid lines 8 on the grid plate 7 as needed in use of the photograph vehicle as hereinafter described.

Referring next to FIGS. 2–4 of the drawings, the photograph vehicle 1 is fitted with a digital camera 27, which is mounted between the parallel bracket arms 15 of the camera support carriage 12 by means of screws, magnets, clips, loop-pile fasteners (not illustrated) or other fastening techniques known to those skilled in the art, with the lens (not illustrated) of the digital camera 27 aimed downwardly toward the grid plate 7. A computer 26, which is typically a notebook or laptop computer but which may be a desktop computer, is supported typically on the top support shelf 22. A digital camera connecting cable 28 connects the digital camera 27 to an appropriate port of the computer 26. A conventional bar code scanner 30, the purpose of which will be hereinafter described, may further be connected to the appropriate port of the computer 26 by means of a scanner connecting cable 31 and is typically cradled in a scanner holder 32 resting on the top support shelf 22 when not in use. As illustrated in FIG. 4, the computer 26 is further connected to a server 37 typically by means of a server interface cable 38, which is plugged into the appropriate port of the computer 26. As hereinafter described, the digital camera 27 is capable of transmitting an image of a part, tool, material or other item 44 (FIG. 3) resting on the grid plate 7, along with the item number (not illustrated) inscribed on an adjacent piece of paper or cardboard, for example, to the computer 26, which groups the item and item number with the identifying bar code detected by the bar code scanner 30, and sends the imaged item and item number and the identifying bar code to the server 37, which indexes and stores the data. The image of the item and item number, stored and indexed on the server 37, can be viewed on a receiving computer 39, such as a desktop, laptop or palmtop computer, via internet access. Accordingly, the computer 26 is programmed with conventional software capable of performing the image-receiving, bar code matching and image-transmitting functions necessary for transmitting the necessary data to the server 37. The bottom support shelf 21 may be used to support spare batteries or other equipment (not illustrated), as needed. The top support shelf 22 may be further provided with a clamping ring (not illustrated) for removably engaging and securing the computer 26 to the top support shelf 22.

Referring again to FIGS. 2–4 of the drawings, in typical application the photograph vehicle 1 is used to photograph all of the parts, tools, materials and other items needed in the production of semiconductors in a semiconductor production plant. The items are cataloged in multiple storerooms in a warehousing facility, and engineers and other personnel in the semiconductor production plant order the items from the warehousing facility, as needed in the production of semiconductors. The photograph vehicle 1 is hand-pushed to each of the storerooms, where all of the items in each storeroom are individually photographed, and the photograph images are stored in a database in the server 37, which can be accessed via internet by the receiving computer 39 in the remote semiconductor production plant. Accordingly, as illustrated in FIG. 3, an item 44 such as a part for a semiconductor processing furnace, or a tool used in the repair or operation of processing apparatus, is positioned on the grid plate 7, with the grid lines 8 indicating both the length and width of the item 44. A piece of paper or cardboard (not illustrated), on which is written the part number of the item 44, is positioned on the grid plate 7 adjacent to the item 44. The camera support carriage 12 is then adjusted vertically on the carriage support post 10 using the carriage adjustment knob 16 (FIG. 5) or carriage adjusting pin 40, as heretofore described, to position the digital camera 27 at the desired height above the item 44 for accurate imaging thereof. The light 34 can be energized as necessary to illuminate the grid plate 7 in a light-deficient environment. The digital camera 27 is then operated to photograph the item 44 and the item number on the adjacent piece of paper or cardboard (not illustrated), and the photographic image is transmitted to the computer 26. The bar code scanner 30 may be used to detect a bar code (not illustrated) provided on the item 44 or on a package in which the item 44 is contained, in which case the computer 26 labels the photographic image of the item 44 with the bar code. The photographic image of the item 44 and item number, and the corresponding bar code of the item 44, if used, are then transmitted to the server 37, which stores and indexes the data. This procedure is repeated for each item in the storeroom. After all of the items in one of the storerooms has been photographed and indexed in the server 37, the photograph vehicle 1 is transported to the next storeroom in the warehousing facility, and the photograph imaging and labeling procedure is repeated for each item in each storeroom. The engineers and other personnel in the semiconductor production facility can then view the image of the desired item and its associated item number on the receiving desktop, laptop or palmtop computer 39, by internet access. This expedient enables the engineers and other plant personnel to more accurately identify the needed item and avoid ordering the wrong items from the warehousing facility.

While the preferred embodiments of the invention have been described above, it will be recognized and understood that various modifications may be made in the invention and the appended claims are intended to cover all such modifications which may fall within the spirit and scope of the invention.

We claim:

1. A photograph vehicle for imaging an object and sending an image of the object to a server for viewing on a receiving computer, comprising:
    a base;
    a plurality of wheels provided on said base for rendering said base portable;
    a grid plate having a plurality of grid lines provided on said base for indicating dimensions of the object;
    a camera carried by said base for generating an image of the object;
    a computer operably connected to said camera for transmitting the image to the server;
    at least one shelf support leg carried by said base; and
    at least one shelf carried by said at least one shelf support leg for supporting said computer.

2. The photograph vehicle of claim 1 wherein said plurality of wheels comprises a pair of front wheels rotatably carried by said base for steering said base and a pair of rear wheels rigidly connected to said base.

3. The photograph vehicle of claim 1 further comprising a carriage support post upward-standing from said base and wherein said camera is vertically adjustably mounted on said carriage support post.

4. The photograph vehicle of claim 3 wherein said plurality of wheels comprises a pair of front wheels rotatably carried by said base for steering said base and a pair of rear wheels rigidly connected to said base.

5. A photograph vehicle for imaging an object and sending an image of the object to a server for viewing on a receiving computer, comprising:
    a base;
    a plurality of wheels provided on said base for rendering said base portable;
    a grid plate having a plurality of grid lines provided on said base for indicating dimensions of the object;
    a camera carried by said base for generating an image of the object;
    a computer operably connected to said camera for transmitting the image to the server; and
    a pair of shelf support legs upward-standing from said base and at least one support shelf carried by said pair of shelf support legs.

6. The photograph vehicle of claim 5 wherein said plurality of wheels comprises a pair of front wheels rotatably carried by said base for steering said base and a pair of rear wheels rigidly connected to said base.

7. A photograph vehicle for imaging an object and sending an image of the object to a server for viewing on a receiving computer, comprising:
    a base;
    a plurality of wheels provided on said base for rendering said base portable;
    a grid plate having a plurality of grid lines provided on said base for indicating dimensions of the object;
    a camera carried by said base for generating an image of the object;
    a computer operably connected to said camera for transmitting the image to the server;
    a carriage support post upward-standing from said base and wherein said camera is vertically adjustably mounted on said carriage support post; and
    a pair of shelf support legs upward-standing from said base and at least one support shelf carried by said pair of shelf support legs.

8. The photograph vehicle of claim 7 wherein said plurality of wheels comprises a pair of front wheels rotatably carried by said base for steering said base and a pair of rear wheels rigidly connected to said base.

9. A photograph vehicle for imaging an object and sending an image of the object to a server for viewing on a receiving computer, comprising:
    a base;
    a plurality of wheels provided on said base for rendering said base portable;
    a grid plate having a plurality of grid lines provided on said base for indicating dimensions of the object;
    a camera carried by said base for generating an image of the object;
    a computer operably connected to said camera for transmitting the image to the server;
    a pair of shelf support legs upward-standing from said base and at least one support shelf carried by said pair of shelf support legs; and
    wherein said at least one support shelf comprises a top support shelf and a bottom support shelf.

10. The photograph vehicle of claim 9 wherein said plurality of wheels comprises a pair of front wheels rotatably carried by said base for steering said base and a pair of rear wheels rigidly connected to said base.

11. The photograph vehicle of claim 9 further comprising a carriage support post upward-standing from said base and wherein said camera is vertically adjustably mounted on said carriage support post.

12. The photograph vehicle of claim 11 wherein said plurality of wheels comprises a pair of front wheels rotatably carried by said base for steering said base and a pair of rear wheels rigidly connected to said base.

13. A photograph vehicle for transport among multiple locations, imaging an object, and sending an image of the object to a server for viewing on a receiving computer, said photograph vehicle comprising:

a base;

a plurality of wheels provided on said base for rendering said base portable;

a grid plate having a plurality of grid lines provided on said base for indicating dimensions of the object;

a carriage support post upward-standing from said base;

a camera support carriage vertically adjustably carried by said carriage support post above said grid plate;

a digital camera provided on said camera support carriage for generating an image of the object;

at least one support provided on said base; and a computer provided on said at least one support and connected to said digital camera for transmitting said image to the server.

14. The photograph vehicle of claim 13 wherein said plurality of wheels comprises a pair of front wheels rotatably carried by said base for steering said base and a pair of rear wheels rigidly connected to said base.

15. The photograph vehicle of claim 13 wherein said at least one support comprises a pair of shelf support legs upward-standing from said base and at least one support shelf carried by said pair of shelf support legs, and said computer is supported by said at least one support shelf.

16. The photograph vehicle of claim 15 wherein said plurality of wheels comprises a pair of front wheels rotatably carried by said base for steering said base and a pair of rear wheels rigidly connected to said base.

* * * * *